Patented May 26, 1931

1,806,714

UNITED STATES PATENT OFFICE

HUGO SCHWEITZER, OF WIESDORF-ON-THE-RHINE, GERMANY, ASSIGNOR TO GENERAL ANILINE WORKS INC., OF NEW YORK, N. Y., A CORPORATION OF DELAWARE

MANUFACTURE OF 2-AMINONAPHTHALENE-3-CARBOXYLIC ACID

No Drawing. Application filed April 5, 1929, Serial No. 352,890, and in Germany February 14, 1927.

The present invention relates to a process of preparing 2-amino-naphthalene-3-carboxylic acid. In accordance with the present invention 2-amino-naphthalene-3-carboxylic acid is produced from 2-hydroxy-naphthalene-3-carboxylic acid in a technically convenient manner by heating for several hours the 2-hydroxy-naphthalene-3-carboxylic acid or the zinc salt thereof with zinc oxide or zinc carbonate and ammonium chloride to an elevated temperature, say from about 150° to about 250° C., the best results being obtained from about 180° to about 200° C. The relative quantities of the starting materials may be varied within the widest limits but generally I start with a mixture containing one part by weight of the 2-hydroxy-naphthalene-3-carboxylic acid or the zinc salt thereof and about one part by weight of zinc oxide or zinc carbonate and about two parts by weight of ammonium chloride. The process is favorably carried out in a ball mill suitable to be heated; the yield may be increased by removing the water formed during the reaction, for example, by passing a dry current of air through the mill, the best results being obtained when passing a current of dry ammonia through the reaction mixture. The dry mixture first becomes a thin paste and finally solidifies to a hard mass; the free acid may be obtained by dissolving the reaction mass in hot water, acidifying the solution with hydrochloric acid, allowing the hydrochloride of 2-amino-naphthalene-3-carboxylic acid to crystalize, dissolving the hydrochloride in sodium carbonate solution and precipitating the free 2-amino-naphthalene-3-carboxylic acid with acetic acid. The invention is illustrated by the following examples, but is not restricted thereto.

Example 1

220 grams of the zinc salt of 2-hydro-naphthalene-3-carboxylic acid, 162 grams of zinc carbonate and 395 grams of ammonium chloride are thoroughly mixed and heated for 3 hours to 190° C. in a continuously rotating ball mill provided with a heating jacket. At the same time a slow current of dry ammonia is passed through the mill. The dry mixture at first becomes a thin paste and finally solidifies to a hard greenish mass. After cooling, the mass is powdered, dissolved in 2000 ccs. of water and 565 grams of hydrochloric acid (19° Bé.) and filtered from any undissolved residue. On cooling, the hydrochloride of 2-amino-naphthalene-3-carboxylic acid crystallizes out. By dissolving in sodium carbonate, filtering from a little dirt and precipitating with acetic acid the 2-amino-naphthalene-3-carboxylic acid is obtained in a pure state. The yield amounts to 80% of the theory.

Example 2

188 grams of 2-hydroxy-naphthalene-3-carboxylic acid, 211 grams of zinc oxide and 395 grams of ammonium chloride are heated for 4 hours to 190° C. in the manner described in Example 1. After cooling, the brownish yellow mass is powdered, lixiviated with about 1000 ccs. of dilute cold hydrochloric acid, and the residue is then boiled for one hour under a reflux condenser with 2000 grams of 10% caustic soda. After filtering hot from undissolved residue, hydrochloric acid is added to the solution while still hot until the liquid has become acid to Congo red. A little unchanged 2-hydroxy-naphthalene-3-carboxylic acid is filtered off and on cooling the hydrochloride of 2-amino-naphthalene-3-carboxylic acid crystallizes out. The yield amounts to 70–80% of the theory.

Example 3

220 grams of the zinc salt of 2-hydroxy-naphthalene-3-carboxylic acid, 162 grams of zinc carbonate and 395 grams of ammonium chloride are heated for 3 hours to 190° C. in a current of dry air as described in Example 1. The working up follows as in Example 1. The yield amounts to 70–80% of the theory.

I claim:

1. A process of preparing 2-amino-naphthalene-3-carboxylic acid, which process comprises heating a compound of the group consisting of 2-hydroxynaphthalene-3-carboxylic acid and the zinc salt thereof with ammoniumchloride and a compound of the group consisting of zinc oxide and zinc carbonate at a temperature of from about 150 to about 250° C. for several hours.

2. A process of preparing 2-amino-naphthalene-3-carboxylic acid, which process comprises heating a compound of the group consisting of 2-hydroxynaphthalene-3-carboxylic acid and the zinc salt thereof with ammoniumchloride and a compound of the group consisting of zinc oxide and zinc carbonate at a temperature of from about 180 to about 200° C. for several hours.

3. A process of preparing 2-amino-naphthalene-3-carboxylic acid, which process comprises heating a mixture comprising about one part by weight of a compound of the group consisting of 2-hydroxynaphthalene-3-carboxylic acid and the zinc salt thereof, about one part by weight of a compound of the group consisting of zinc oxide and zinc carbonate and about two parts by weight of ammoniumchloride at a temperature of from about 150° to about 250° C. for several hours.

4. A process of preparing 2-amino-naphthalene-3-carboxylic acid, which process comprises heating a mixture comprising about one part by weight of a compound of the group consisting of 2-hydroxynaphthalene-3-carboxylic acid and the zinc salt thereof, about one part by weight of a compound of the group consisting of zinc oxide and zinc carbonate and about two parts by weight of ammoniumchloride at a temperature of from about 180° to about 200° C. for several hours.

5. A process of preparing 2-amino-naphthalene-3-carboxylic acid, which process comprises heating a compound of the group consisting of 2-hydroxynaphthalene-3-carboxylic acid and the zinc salt thereof with ammoniumchloride and a compound of the group consisting of zinc oxide and zinc carbonate at a temperature of from about 150° to about 250° C. for several hours and removing thereby the water formed in the reaction.

6. A process of preparing 2-amino-naphthalene-3-carboxylic acid, which process comprises heating a compound of the group consisting of 2-hydroxynaphthalene-3-carboxylic acid and the zinc salt thereof with ammoniumchloride and a compound of the group consisting of zinc oxide and zinc carbonate at a temperature of from about 180° to about 200° C. for several hours and removing thereby the water formed in the reaction.

7. A process of preparing 2-amino-naphthalene-3-carboxylic acid, which process comprises heating a mixture comprising about one part by weight of a compound of the group consisting of 2-hydroxynaphthalene-3-carboxylic acid and the zinc salt thereof, about one part by weight of a compound of the group consisting of zinc oxide and zinc carbonate and about two parts by weight of ammoniumchloride at a temperature of from about 150° to about 250° C. for several hours and removing thereby the water formed in the reaction.

8. A process of preparing 2-amino-naphthalene-3-carboxylic acid, which process comprises heating a mixture comprising about one part by weight of a compound of the group consisting of 2-hydroxynaphthalene-3-carboxylic acid and the zinc salt thereof, about one part by weight of a compound of the group consisting of zinc oxide and zinc carbonate and about two parts by weight of ammoniumchloride at a temperature of from about 180° to about 200° C. for several hours and removing thereby the water formed in the reaction.

9. A process of preparing 2-amino-naphthalene-3-carboxylic acid, which process comprises heating a compound of the group consisting of 2-hydroxynaphthalene-3-carboxylic acid and the zinc salt thereof with ammonium-chloride and a compound of the group consisting of zinc oxide and zinc carbonate at a temperature of from about 150° to about 250° C. for several hours and passing simultaneously a current of dry ammonia through the reaction mixture, thereby removing the water formed by the reaction.

10. A process of preparing 2-amino-naphthalene-3-carboxylic acid, which process comprises heating a compound of the group consisting of 2-hydroxynaphthalene-3-carboxylic acid and the zinc salt thereof with ammoniumchloride and a compound of the group consisting of zinc oxide and zinc carbonate at a temperature of from about 180° to about 200° C. for several hours and passing simultaneously a current of dry ammonia through the reaction mixture, thereby removing the water formed by the reaction.

11. A process of preparing 2-amino-naphthalene-3-carboxylic acid, which process comprises heating a mixture comprising about one part by weight of a compound of the group consisting of 2-hydroxynaphthalene-3-carboxylic acid and the zinc salt thereof, about one part by weight of a compound of the group consisting of zinc oxide and zinc carbonate and about two parts by weight of ammoniumchloride at a temperature of from about 150° to about 250° C. for several hours and passing simultaneously a current of dry ammonia through the reaction mixture, thereby removing the water formed by the reaction.

12. A process of preparing 2-amino-naphthalene-3-carboxylic acid, which process comprises heating a mixture comprising about one part by weight of a compound of the group consisting of 2-hydroxynaphthalene-3-carboxylic acid and the zinc salt thereof, about one part by weight of a compound of the group consisting of zinc oxide and zinc carbonate and about two parts by weight of ammoniumchloride at a temperature of from about 180° to about 200° C. for several hours and passing simultaneously a current of dry ammonia through the reaction mixture, thereby removing the water formed by the reaction.

13. A process of preparing 2-amino-naphthalene-3-carboxylic acid, which process comprises heating a mixture of about one part by weight of the zinc salt of 2-hydroxynaphthalene-3-carboxylic acid, about one part by weight of zinc carbonate and about two parts by weight of ammoniumchloride to about 190° C. for several hours, and passing simultaneously a current of dry ammonia through the reaction mixture, dissolving the melt in dilute hydrochloric acid, filtering the hydrochloride of 2-amino-napthalene-3-carboxylic acid, dissolving the same in aqueous sodium carbonate solution and precipitating the 2-amino-naphthalene-3-carboxylic acid by the addition of acetic acid.

14. A process of preparing 2-amino-naphthalene-3-carboxylic acid, which process comprises heating a mixture of 220 grams of the zinc salt of 2-hydroxy-naphthalene-3-carboxylic acid, 162 grams of zinc carbonate and 395 grams of ammoniumchloride for about 3 hours to a temperature of about 190° C., passing simultaneously a current of dry ammonia through the reaction mixture, dissolving the melt in diluted hydrochloric acid, filtering the hydrochloride of 2-amino-naphthalene-3-carboxylic acid, dissolving the same in aqueous sodium carbonate solution and precipitating the 2-amino-naphthalene-3-carboxylic acid by the addition of acetic acid.

In testimony whereof I have hereunto set my hand.

HUGO SCHWEITZER. [L. S.]